US007962858B2

(12) United States Patent
Choi

(10) Patent No.: US 7,962,858 B2
(45) Date of Patent: Jun. 14, 2011

(54) MOBILE COMMUNICATION TERMINAL WITH A SCHEDULE MANAGEMENT METHOD

(75) Inventor: Changkeun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 961 days.

(21) Appl. No.: 11/827,603

(22) Filed: Jul. 11, 2007

(65) Prior Publication Data

US 2008/0016444 A1 Jan. 17, 2008

(30) Foreign Application Priority Data

Jul. 11, 2006 (KR) .................. 10-2006-0064945

(51) Int. Cl.
*G06F 13/00* (2006.01)
*G06F 15/00* (2006.01)
(52) U.S. Cl. ........................................ 715/851; 715/742
(58) Field of Classification Search .......... 715/762–765, 715/851–853, 855, 740, 742, 744, 711, 700; 455/566, 455, 414
See application file for complete search history.

(56) References Cited

U.S. PATENT DOCUMENTS

| 5,903,845 A * | 5/1999 | Buhrmann et al. ........... 455/461 |
| 7,624,357 B2 * | 11/2009 | De Bast ........................ 715/828 |
| 2005/0075097 A1 * | 4/2005 | Lehikoinen et al. ....... 455/414.1 |
| 2007/0060205 A1 * | 3/2007 | Kim ............................. 455/566 |

FOREIGN PATENT DOCUMENTS

| JP | 2003152830 | 5/2003 |
| JP | 2004088479 | 3/2004 |

OTHER PUBLICATIONS

Oceansoft "Schedule is indicated in the picture of the electronic bulletin board wind; comprehensive information management tool Agenda" http://www.forest.impress.co.jp/article/2001/05/15/agenda.html May 15, 2001.

* cited by examiner

*Primary Examiner* — Cao "Kevin" Nguyen
(74) *Attorney, Agent, or Firm* — Lee, Hong, Degerman, Kang & Waimey

(57) ABSTRACT

A method for reminding a user of a mobile communication terminal of an event scheduled using a scheduling feature of the mobile communication terminal is provided. The method comprises displaying an alert, associated with a scheduled event, on a display screen of the mobile communication terminal, wherein the alert is in a format that conspicuously distinguishable from other information displayed on the display screen to prompt the user's immediate attention.

25 Claims, 5 Drawing Sheets

MOBILE COMMUNICATION TERMINAL WITH A SCHEDULE MANAGEMENT METHOD

CROSS-REFERENCE TO RELATED APPLICATION

The present application claims priority from Korean Patent Application No. 2006-64945, filed Jul. 11, 2006, the entire contents of which is incorporated herein by reference.

FIELD OF THE INVENTION

The present invention relates to a mobile communication terminal with a schedule management method.

BACKGROUND

Most mobile communication terminals have calendaring and time scheduling features. A user can set his schedule by registering a date, a meeting time, a ceremony day, and the like, in the mobile communication terminal. A user may also manage his schedule by setting an alarm function that corresponds to a registered date.

Currently provided time scheduling features have a reminder function that alerts the user by generating an audible sound (e.g., ring tone, music, etc.). Unfortunately, many users do not hear the audible sound and miss the scheduled meeting or deadline.

Systems and method are needed that provide a more conspicuous alert feature.

SUMMARY

A method for reminding a user of a mobile communication terminal of an event scheduled using a scheduling feature of the mobile communication terminal, the method comprising displaying an alert, associated with a scheduled event, on a display screen of the mobile communication terminal, wherein the alert is in a format that conspicuously distinguishable from other information displayed on the display screen to prompt the user's immediate attention.

In one embodiment, the alert comprises first information associated with the scheduled event, the method further comprising displaying the first information moving across, in highlighted format or flashing across the display screen. In some embodiments, the method further comprising displaying the first information in an animated format across the display screen. The first information may move across the screen at a first speed as selected by the user.

In accordance with one or more embodiments, the alert is displayed at a predetermined time interval prior to expiration of the scheduled event. The predetermined time interval may be selected by the user.

In certain embodiments a plurality of alerts are displayed on the display screen in a first order, wherein a first alert associated with a first event due at a first point in time is displayed in an ordered list before a second alert associated with a second event due at a second point in time, wherein the first point in time is earlier than the second point in time. Preferably, the user selects maximum number of alerts displayed on the display screen at each display instance.

In accordance with another aspect of the invention, a system for reminding a user of a mobile communication terminal of an event scheduled using a scheduling feature of the mobile communication terminal is provided. The system comprises a display unit and a processor for displaying an alert, associated with a scheduled event, on a display screen of the mobile communication terminal, wherein the alert is in a format that conspicuously distinguishable from other information displayed on the display screen to prompt the user's immediate attention.

BRIEF DESCRIPTION OF THE DRAWINGS

The above aspects of the present invention will be more apparent by describing certain exemplary embodiments of the present invention with reference to the accompanying drawings, in which.

Hereinafter, exemplary embodiments of the present invention will be described in detail with reference to the accompanying drawings.

DETAILED DESCRIPTION OF PREFERRED EMBODIMENTS

Figure 1:
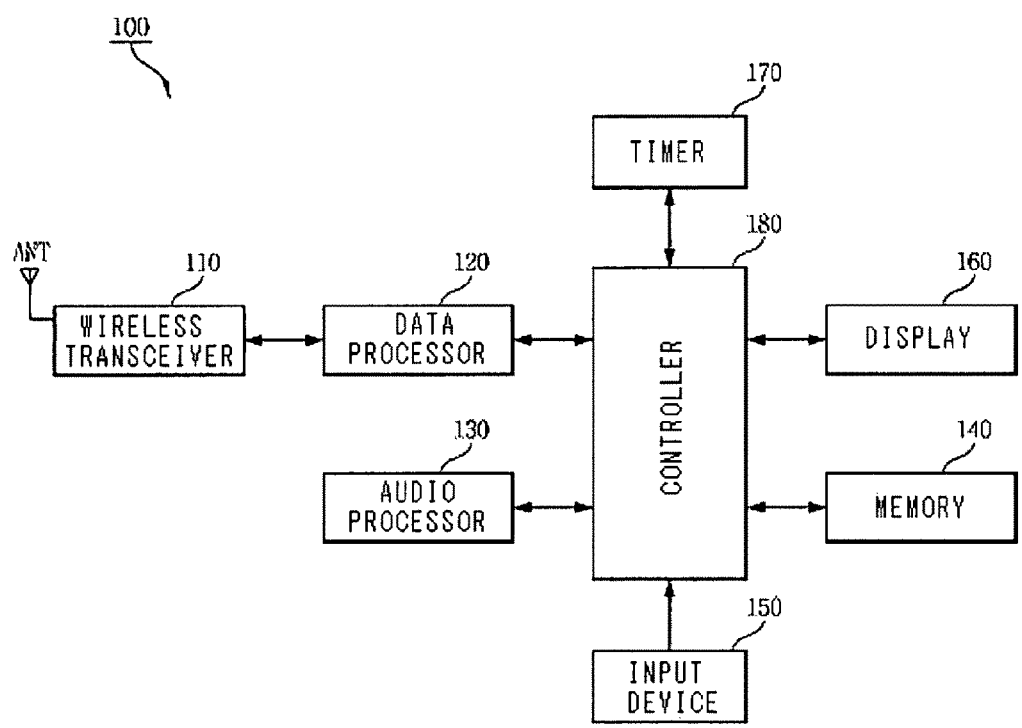
FIG. 1 is a block diagram illustrating a mobile communication terminal according to an exemplary embodiment.

Referring to FIG. 1, the mobile communication terminal 100 comprises a wireless transceiver 110, a data processor 120, an audio processor 130, a memory 140, a display 150, an input device 160, a timer 170, and a controller 180. The wireless transceiver 110 performs a communication function of the mobile communication terminal 100. The wireless transceiver 110 comprises a RF sender for up-converting and amplifying of a frequency of a sending signal, and a RF receiver for low-noise amplifying a receiving signal and down-converting a frequency of the receiving signal.

The data processor 120 comprises a sender unit for encoding and modulating a transmitted signal and a receiver unit for decoding and demodulating a received signal. The audio processor 130 reproduces an audio signal that is decoded and output by the data processor 120, or sends the audio signal produced by a microphone to the data processor 120.

According to one embodiment, the audio processor 130 performs text to speech conversion in order to convert content set by the user into speech under the control of the controller 180, and then outputs the converted speech to a speaker (SPK). The memory 140 comprises at least one program memory and data memory. The program memory stores programs for controlling general operations of the mobile communication terminal 100.

According to one embodiment, the memory 140 stores a schedule management program and schedule information inputted by a user. The schedule information comprises a schedule time and date. The display 160 displays various kinds of display information, and various menu screens and may comprise a liquid crystal display or an organic light emitting diode.

According to one embodiment, the display 160 displays various menu screens of the schedule management program for inputting the user's schedule information, and various menu screens for setting the input schedule information and schedule management function, under the control of the controller 180.

The input device 150 comprises various buttons for inputting numeral and character information, and at least one function button for setting various functions. The input device 160 may comprise a keypad, a jog-dial, a touch screen, a joystick, or other user interface mechanism having a directional key.

According to one embodiment, the input device 150 sends schedule information inputted by the user to the controller 180. The schedule information comprises the schedule time and date. The timer 170 provides present date and time information to the controller 180. The controller 180 manages the general control of the mobile communication terminal 100, and may be comprised of the data processor 120 and the timer 170.

According to one embodiment, the controller 180 checks the schedule date and time from schedule information stored in the memory 140, and then compares the present date and time with the schedule date and time to check schedule information within 24 hours from the present time. The controller 180 controls the display 160 so that the schedule information is displayed while moving across the screen in one or more directions.

Figure 2:
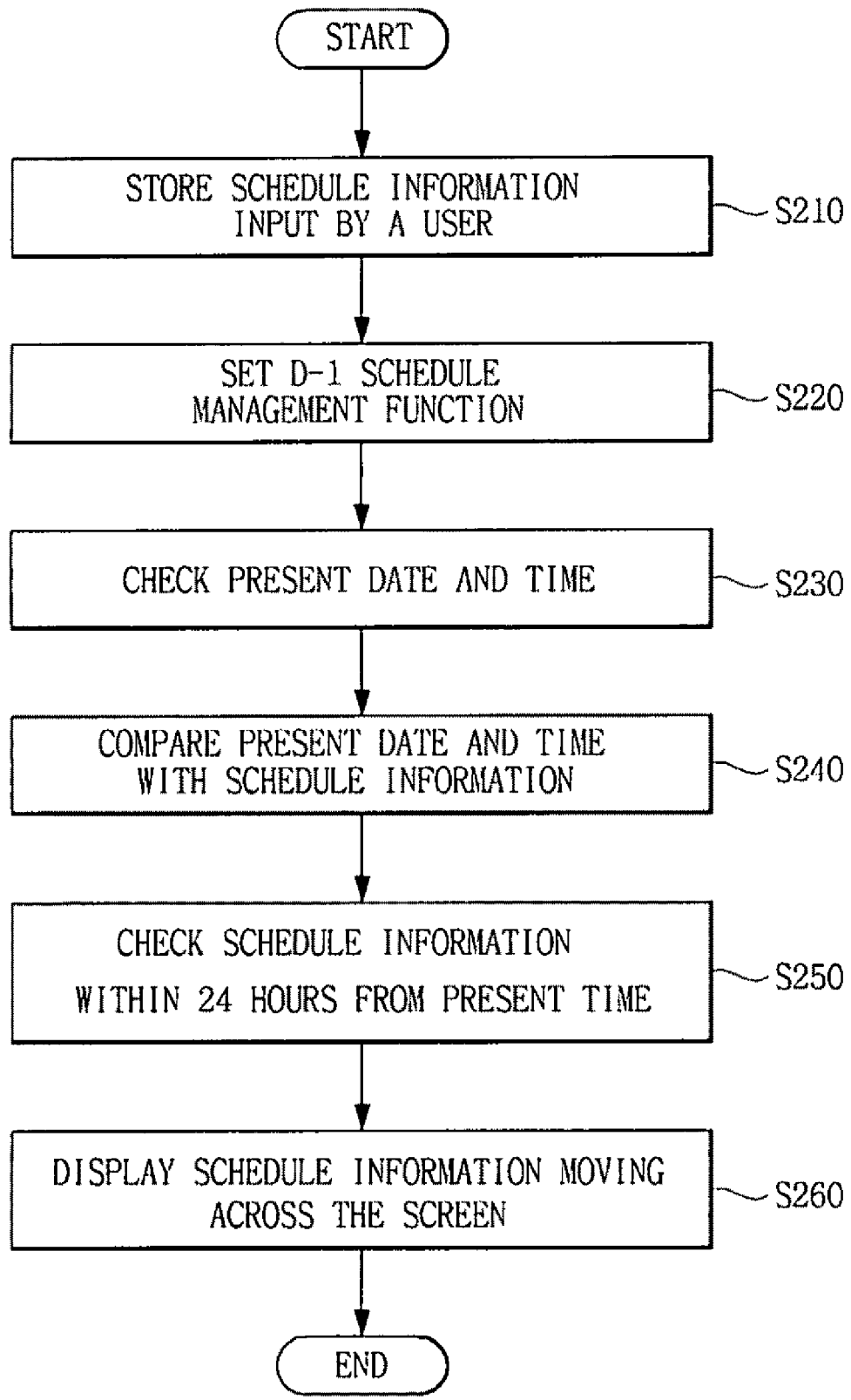
FIG. 2 is a flow chart illustrating a schedule management method using a mobile communication terminal according to an exemplary embodiment.

FIG. 2 is a flow chart illustrating a schedule management method using a mobile communication terminal according to an exemplary embodiment. Referring to FIG. 2, the users input their schedule information using a schedule management program. In the schedule management program, the user selects a schedule management menu through the input device 150, and then inputs various kinds of information to the mobile communication terminal.

The various information may comprise of peoples names, as well as their home addresses, their business addresses, their email addresses, their birthdays, their wedding anniversary, etc. The schedule information input by a user is stored in the schedule management program of the memory 140 (S210). In order to use the schedule management function, in one embodiment, the user sets a D-1 schedule management function (S220).

Figure 3A:
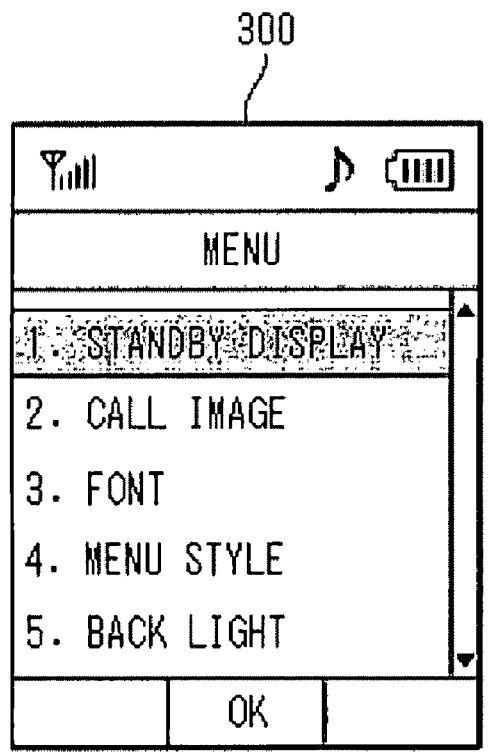
FIGS. 3A to 3D show an example of a screen illustrating a process in which a schedule management function is set by a user, in accordance with one embodiment.
Figure 3B:
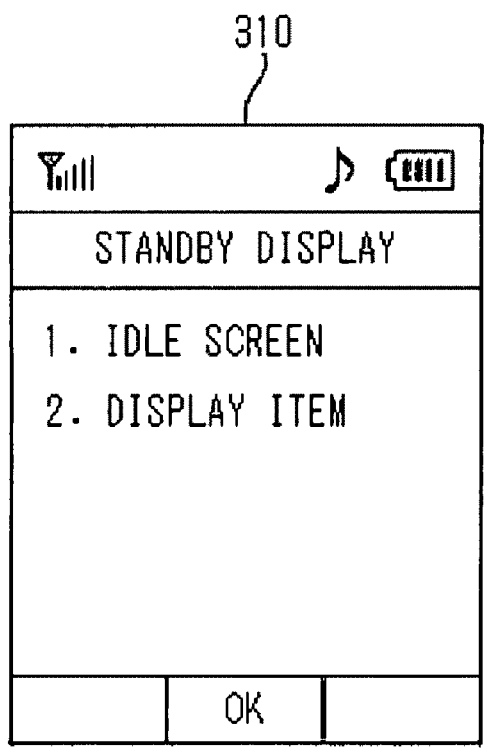

Referring to FIG. 3A, a user may access a menu screen 300 to select from a standby display menu via the input device 150. When the user selects from the standby display menu, a screen 310, including an idle screen menu and a display item menu, is displayed as shown in FIG. 3B.

Figure 3C:
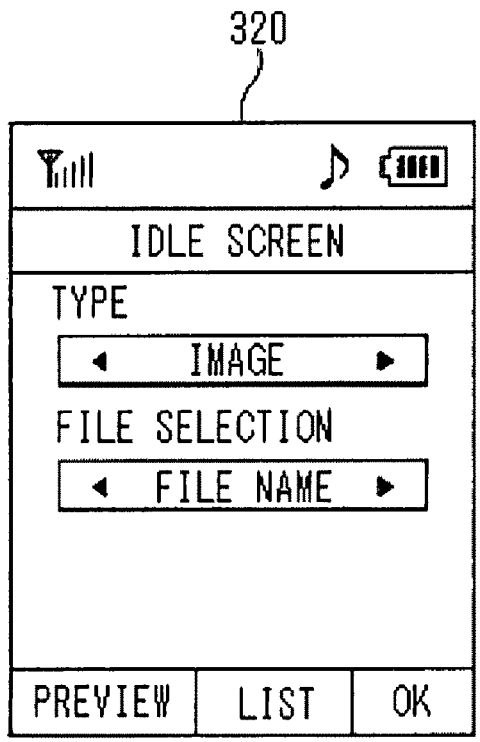

When the user selects the idle screen menu, an idle screen setup menu 320 is displayed on the idle screen, as shown in FIG. 3C, so that the user can select files to be inserted into the idle screen. Using the idle screen setup menu 320, the user can set various files to be inserted into the idle screen.

Figure 3D:
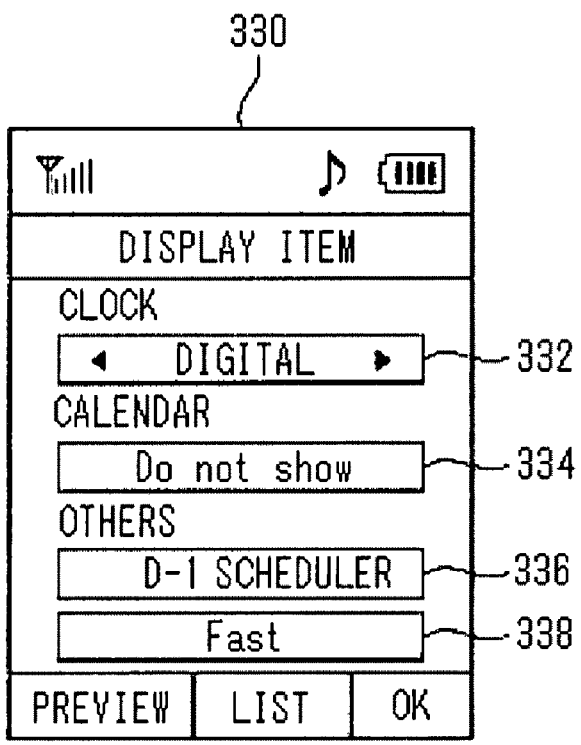

A user may selects a display item setup menu 330 as shown in FIG. 3D. The display item setup menu 330 is a menu screen for setting a clock, a calendar, a D-1 scheduler, and an animation speed. The animation speed controls the manner in which a reminder item is displayed on the mobile communication terminal's screen.

Using a clock setup window 332, the user can set items such as a digital watch, an analog watch, a dual clock, and a "do not show" state for the clock. Further, using a calendar setup window 334, the user can set items such as a "calendar setup" or a "do not show" state for the calendar. In one embodiment, the user can set the schedule management function using a D-1 scheduler setup window 336.

A speed setup window 338 under the D-1 scheduler setup window 338 sets a moving speed for the user's schedule information to be displayed across the screen. The moving speed of the schedule information may be set to various speeds such as slow, normal, fast, very fast, etc. Thus, the user can set a schedule management function and choose an animated object to be displayed on the mobile communication terminal's screen at a predefined time before a scheduled event is due, according to one embodiment.

Referring back to FIG. 2, the timer 170 provides the date and time information to the controller 180 in real time. The controller 180 checks the present date and time information provided by the timer 170 (S230), and compares the schedule information stored in the schedule management program with the date and time information provided by the timer 170 (S240).

In one embodiment, the controller 180 checks schedule information within 24 hours from the present time (S250). The controller 180 controls the display 160 so that the schedule information which is within 24 hours from the present point in time is displayed across the screen moving in one or more directions (S260). The moving speed of the schedule information may be determined according to user interaction with a speed setup window 338, shown in FIG. 3D.

Figure 3E:
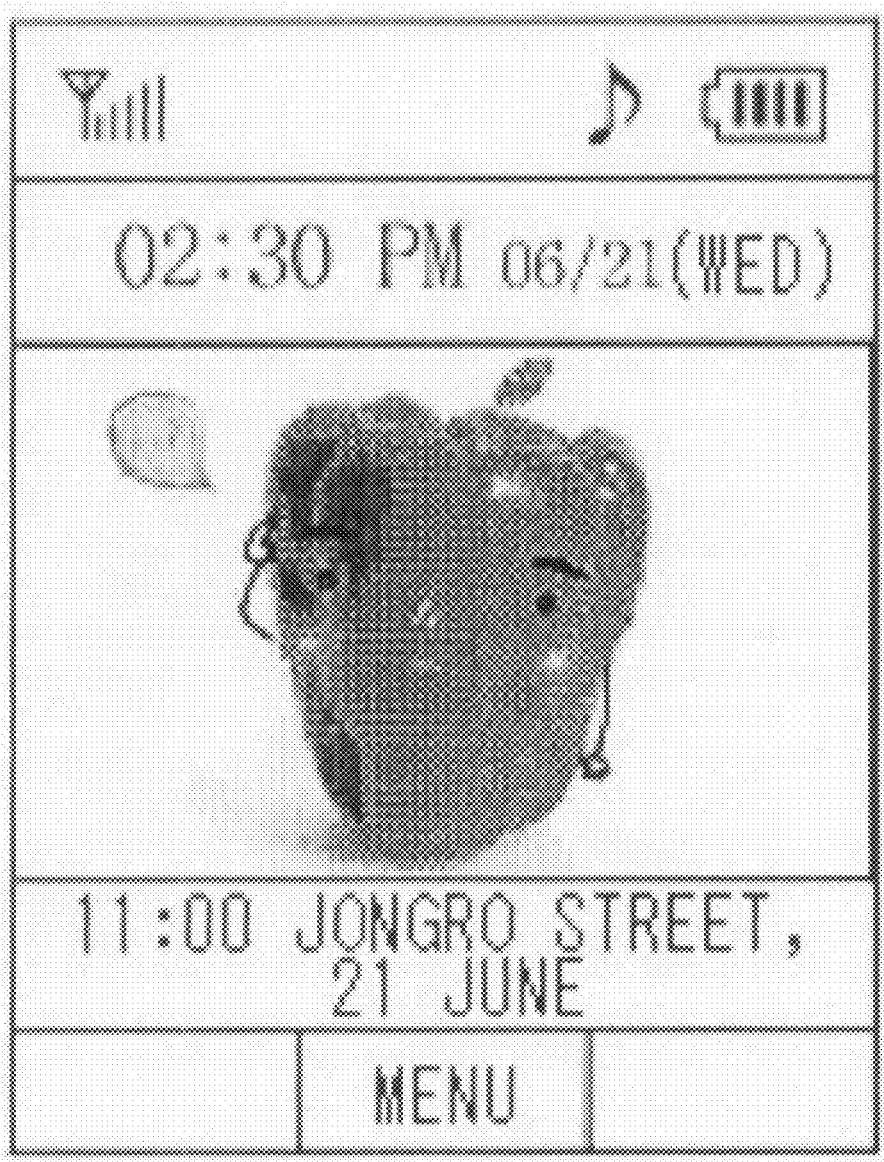
FIG. 3E shows an example of a screen illustrating schedule information, which is displayed while moving in a specific direction on an idle screen.

FIG. 3E shows an example of a screen illustrating schedule information moving in a first direction on the screen, according to one embodiment. Referring to FIG. 3E, an exemplary screen may display the schedule information comprising the schedule contents, the schedule time, and the schedule date.

In one embodiment, the number of scheduled information within 24 hours from the present time may exceed a threshold for the total number of items that can be displayed on the mobile communication terminal's screen. If so, the controller 180 performs limits the displayed information so that a predetermined amount of schedule information is displayed on the idle screen.

For example, if the threshold is to display five items, the controller 180 determines whether the number of schedule information within 24 hours from the present time point exceeds five. In one embodiment, the display 160 may display one or more schedule information, each on a separate line on the screen.

In one embodiment, if a specific event occurs in a state where one of the plurality of scheduled information is displayed on the screen, scheduled information other than those displayed on the screen may be alternatively displayed on the screen. Here, the term "specific event" means the case where a specific key is selected. For example, where a slider of a sliding mobile communication terminal or a folder of a folder type mobile communication terminal is opened or closed, or the case where the user touches the mobile communication terminal.

According to one embodiment, the schedule information is displayed in text form on the screen. In other embodiments, the schedule information may be displayed in a schedule management table format or by way of an icon on the screen. The schedule management table may represent the D-1 schedule information, in various forms, by for example highlighting, flashing, enlarging, or other animated functions.

In one embodiment, the controller 180 causes schedule information within 24 hours from the present time to be displayed on the screen. In other embodiments, the controller 180 may cause schedule information scheduled in days, weeks, or months from the present time point to be displayed on the idle screen. Such time periods may be set according to user preference.

As described above, a user can schedule an event in his mobile communication terminal and set an alert feature for the mobile terminal to generate a reminder to notify the user of the scheduled event in advance. The user can specify how long in advance the reminder should be generated. In one embodiment, the reminder is conspicuously (e.g., in an animated format) displayed on the display of the mobile communication terminal to catch the attention of the user.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for reminding a user of a mobile communication terminal of an event scheduled using a scheduling feature of the mobile communication terminal, the method comprising:
    checking, by a controller of the mobile communication terminal, schedule information stored in a memory of the mobile communication terminal;
    determining, by the controller, that at least one event is scheduled within a preset period of time based upon the stored schedule information and a current time;
    displaying an alert, associated with the at least one scheduled event, on a display screen of the mobile communication terminal, the display screen being a touch screen configured to receive a touch input; and
    displaying additional information, associated with the at least one scheduled event other than the alert displayed on the screen, in response to the touch input received via the screen while the alert is displayed.

2. The method of claim 1, wherein the alert comprises first information associated with the at least one scheduled event, the method further comprising displaying the first information, the displayed first information automatically moving across the display screen.

3. The method of claim 2, wherein the displayed first information moves across the screen at a first speed as preset by the user.

4. The method of claim 1, wherein the alert comprises first information associated with the at least one scheduled event, the method further comprising displaying the first information in highlighted format on the display screen.

5. The method of claim 1, wherein the alert comprises first information associated with the at least one scheduled event, the method further comprising displaying the first information flashing across the display screen.

6. The method of claim 1, wherein the alert comprises first information associated with the at least one scheduled event, the method further comprising displaying the first information in an animated format across the display screen.

7. The method of claim 1, wherein the alert is displayed periodically at a predetermined time interval until the scheduled event expires.

8. The method of claim 7, wherein the predetermined time interval is preset by the user.

9. The method of claim 1, wherein the at least one scheduled event comprises a plurality of scheduled events, the method further comprising displaying a plurality of alerts, associated with the plurality of scheduled events, on the display screen in a first order, wherein a first alert associated with a first scheduled event due at a first point in time is displayed in an ordered list before a second alert associated with a second scheduled event due at a second point in time, wherein the first point in time is earlier than the second point in time.

10. The method of claim 9, further comprising receiving input for setting a maximum number of alerts to be displayed on the display screen at each display instance such that only the maximum number of alerts among the plurality of scheduled events are displayed at once.

11. The method of claim 1, wherein information associated with the at least one scheduled event is displayed on one or more lines such that each additional information is displayed on a separate line on the display screen.

12. The method of claim 1, wherein information associated with the at least one scheduled event is displayed in a schedule management table format or by way of an icon on the screen.

13. The method of claim 1, further comprising receiving the schedule information via an input device of the mobile communication terminal, wherein the preset period of time comprises a period in hours, days, weeks, or months.

14. A mobile communication terminal having a scheduling feature, the terminal comprising:
    an input unit for receiving schedule information, the input unit comprising a touch screen configured to receive a touch input;
    a memory for storing the schedule information;
    a display unit comprising the touch screen; and
    a processor configured to:
        check the schedule information stored in the memory;
        determine whether at least one event is scheduled within a preset period of time based upon the stored schedule information and a current time
        display an alert, associated with the at least one scheduled event, on the display unit; and
        display additional information associated with the at least one scheduled event other than the alert displayed on the display unit in response to the touch input received via the touch screen while the alert is displayed.

15. The terminal of claim 14, wherein the alert comprises first information associated with the at least one scheduled event, the displayed first information automatically moving across the display unit.

16. The terminal of claim 15, wherein the first information moves across the display unit at a first speed as preset by the user.

17. The terminal of claim 14, wherein the alert comprises first information associated with the at least one scheduled event, the first information being displayed in highlighted format on the display unit.

18. The terminal of claim 14, wherein the alert comprises first information associated with the at least one scheduled event, the first information being displayed across the display unit.

19. The terminal of claim 14, wherein the alert comprises first information associated with the at least one scheduled event, the first information being displayed to flash in an animated format across the display unit.

20. The terminal of claim 14, wherein the alert is displayed periodically at a predetermined time interval until the scheduled event expires.

21. The terminal of claim 20, wherein the predetermined time interval is preset by the user.

22. The terminal of claim 14, wherein the at least one scheduled event comprises a plurality of scheduled events and the processor is further configured to display a plurality of alerts, associated with the plurality of scheduled events, on the display unit in a first order, wherein a first alert associated with a first scheduled event due at a first point in time is displayed in an ordered list before a second alert associated with a second scheduled event due at a second point in time, wherein the first point in time is earlier than the second point in time.

23. The terminal of claim 22, wherein the input unit further receives input for setting a maximum number of alerts to be displayed on the display unit at each display instance and the processor is further configured to display only the maximum number of alerts, among the plurality of scheduled events, at once.

24. The terminal of claim 14, wherein information associated with the at least one scheduled event is displayed on one or more lines such that each additional information is displayed on a separate line on the display unit.

25. The terminal of claim 14, wherein information associated with the at least one scheduled event is displayed in a schedule management table-format or by way of an icon on the display unit.

* * * * *